United States Patent [19]

Ikuhara

[11] Patent Number: 5,031,031
[45] Date of Patent: Jul. 9, 1991

[54] VIDEO SIGNAL PROCESSING APPARATUS
[75] Inventor: Hideyuki Ikuhara, Osaka, Japan
[73] Assignee: Matsushita Electric Industrial Co., Ltd., Japan
[21] Appl. No.: 371,858
[22] Filed: Jun. 27, 1989
[30] Foreign Application Priority Data
Jun. 28, 1988 [JP]  Japan .................. 63-160092
[51] Int. Cl.$^5$ ............................................ H04N 9/70
[52] U.S. Cl. ............................................ 358/14; 358/26
[58] Field of Search ............................ 358/13, 14, 26

[56] References Cited
FOREIGN PATENT DOCUMENTS
0051393  3/1987  Japan .
0176286  8/1987  Japan .

OTHER PUBLICATIONS
Funkschau 6/1987, Munich, Herbert Noll "Alles auf einem Chip", pp. 24–26.
Rundfunktechnische Mitteilungen RTM 1/85, Hamburg, Christoph Dosch, "C–Mac/Paket–Normvorschlag der europaischen Rundfunkunion fur den Satellitenrundfunk", pp. 23–35.

Primary Examiner—Tommy P. Chin
Assistant Examiner—David E. Harvey
Attorney, Agent, or Firm—Lowe, Price, LeBlanc, Becker & Shur

[57] ABSTRACT

A video signal processing apparatus for processing a video signal including SYNC pulses, a time-compressed color difference and luminance signals, compression factors of those signals being different from each other, the color difference signal and luminance signals being transmitted sequentially for one horizontal line for simultaneously outputting time-reproduced color difference and luminance signals comprises: first and second time-expansion circuits for producing the time-reproduced luminance and color difference signals in response to first and second clocks respectively; a switching circuit for selectively outputting the time-reproduced color difference signal in response to a control signal; a PLL responsive to the video signal including a frequency dividing circuit for producing the first and second clocks, and a synthesized SYNC pulse; and a phase detecting circuit for detecting a phase relation between the video signal and the synthesized SYNC pulse to produce the control signal. When the PLL is out of phase with the SYNC pulse, i.e., not locked, the switch does not transfer the color difference signal from the second time-expansion circuit, preventing time-reproduced signals from producing a double image on a display.

20 Claims, 6 Drawing Sheets

MAC SYSTEM VIDEO SIGNAL

TCI SYSTEM VIDEO SIGNAL

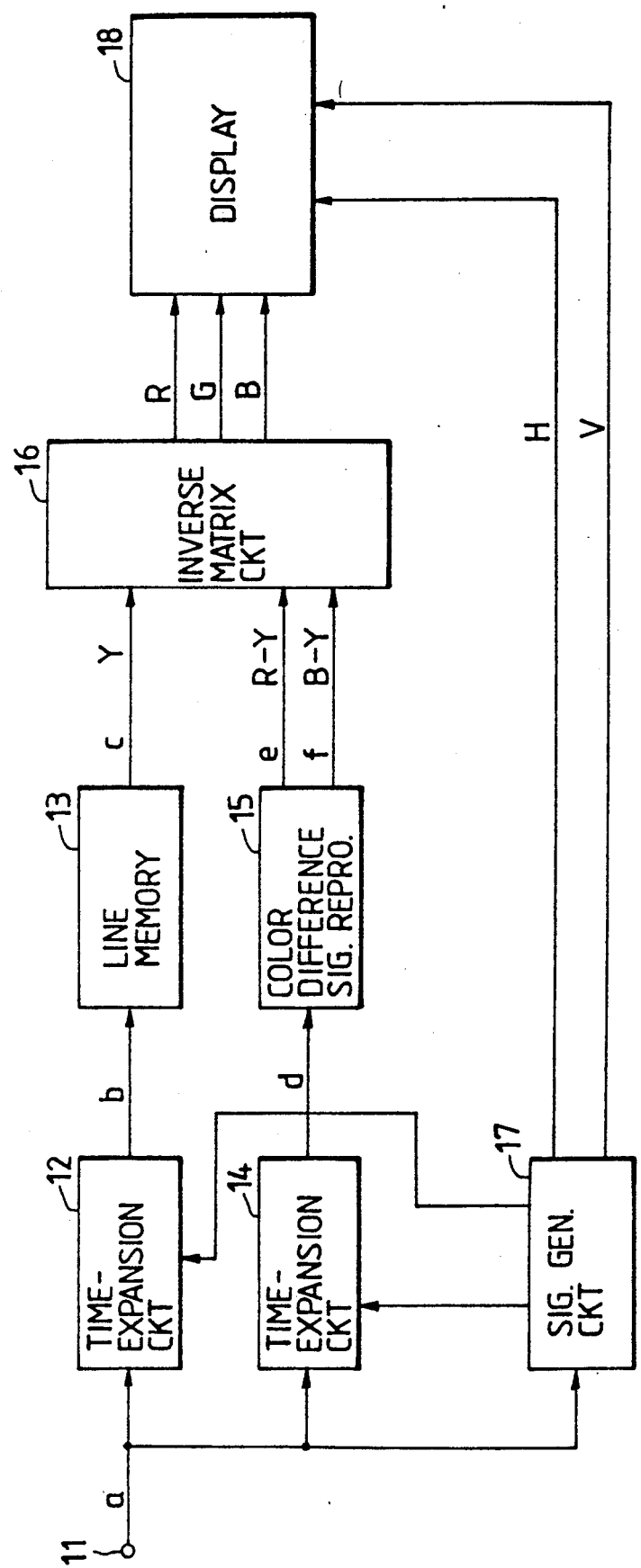

VIDEO SIGNAL PROCESSING APPARATUS

BACKGROUND OF THE INVENTION

1. Field of the Invention

This invention relates generally to a video signal processing apparatus and more particularly, the invention relates to a video signal processing apparatus for reproducing luminance and color difference signals from a video signal including a time-compressed luminance and color difference signals in one horizontal scanning line interval, their time-compressed factors being different each other.

2. Description of the Prior Art

A video signal processing apparatus is used for reproducing luminance and color difference signals from a time-division-multiplexed video signal including a time-compressed luminance and color difference signals by time-expansion. Such a video signal is employed in MAC (Multiplexed Analog Components), TCI (Time Compressed Insertion) systems, and other systems using time-division-multiplexed video signal.

FIG. 3 shows an MAC system video signal. In FIG. 3, block 1 includes synchronizing and data signals; block 2, a color difference signal which is time-compressed by ½; and block 3, a luminance signal which is time-compressed by ⅔. These signals are transmitted for 1 H (one horizontal scanning interval). FIG. 4 shows a TCI system video signal. In FIG. 4, block 21 includes synchronizing and data signals: block 22, a color difference signal which is time-compressed by ¼; and block 23, a luminance signal which is time-compressed by 1. These signals are transmitted for 1 H.

A prior art video processing circuit is shown in FIG. 9 of a block diagram. In FIG 9, an input video signal "a" is applied to an input terminal 11 and is sent to a time-expansion circuit 12, a time-expansion circuit 14, and a signal generation circuit 17. The time-expansion circuit 12 expands a luminance signal of the video signal "a" by an expansion ratio of three to reproduce a luminance signal with respect to time base. The time-expansion circuit 14 expands a color difference signal of the video signal "a" by an expansion ratio of 3/2 to reproduce a color difference signal with respect to time base. Time-expanded signals "b" and "d" are sent to an inverse matrix circuit 10 through a line memory 13 and a color difference signal reproduction circuit 15 respectively. The line memory 13 adjusts timing relation between these video signals. The color difference signal reproduction circuit 15 reproduces simultaneously two color difference signals from two successive horizontal scanning lines of the signal "d". The inverse matrix circuit 16 produces primary color signals R. G. and B sent to a display 18. The time-expansion circuits 12 and 14 are controlled by clocks from a signal generating circuit 17 which generates clock signals by an unshown phase-locked loop circuit responsive to a horizontal synchronizing pulse detected from the input video signal.

As mentioned above, the prior art video processing apparatus reproduces a video signal from time-compressed video signals. However, there is a drawback that when an output signal of the phase-locked loop circuit (PLL) of the signal generation circuit 17 is out of phase with its input signal, i.e. not locked, the time-expanded luminance signal becomes out of phase with the time-expanded color difference signal because time expansion ratios of the time-expansion circuits 12 and 14 are different therebetween. Therefore, there are two types of disturbed images, i.e., color and luminance images on the display 18 when the PLL is not locked. Such a disturbed color image over the disturbed luminance image gives a viewer unpleasant feeling. In other words, a reproduced video image on the display 18 has a double image of luminance and color images when the PLL is not locked.

SUMMARY OF THE INVENTION

The present invention has been developed in order to remove the above-described drawbacks inherent to the conventional video processing apparatus.

According to the present invention there is provided a video signal processing apparatus for processing a video signal including synchronizing pulses, a time-compressed color difference and luminance signals, compression factors of those signals being different from each other, the color difference signal and luminance signals being transmitted sequentially for one horizontal line for simultaneously outputting time-reproduced color difference and luminance signals, comprises: first and second time-expansion circuits for producing the time-reproduced luminance and color difference signals in response to first and second clocks respectively: a switching circuit for selectively outputting the time-reproduced color difference signal in response to a control signal; a PLL responsive to the video signal including a frequency dividing circuit for producing the first and second clocks, and a synthesized synchronizing pulse: and a phase detecting circuit for detecting a phase relation between the video signal and the synthesized synchronizing pulse to produce the control signal. When the PLL is out of phase with the synchronizing pulse, i.e., not locked, the switch does not transfer the color difference signal from the second time-expansion circuit, preventing time-reproduced signals from producing a double image on a display.

The control signal can also obtained from a phase detector included in the PLL.

BRIEF DESCRIPTION OF THE DRAWINGS

The object and features of the present invention will become more readily apparent from the following detailed description taken in conjunction with the accompanying drawings in which:

FIG. 9 is a block diagram of a video signal processing circuit of prior art.

The same or corresponding elements or parts are designated at like references throughout the drawings.

DETAILED DESCRIPTION OF THE INVENTION

Figure 1:
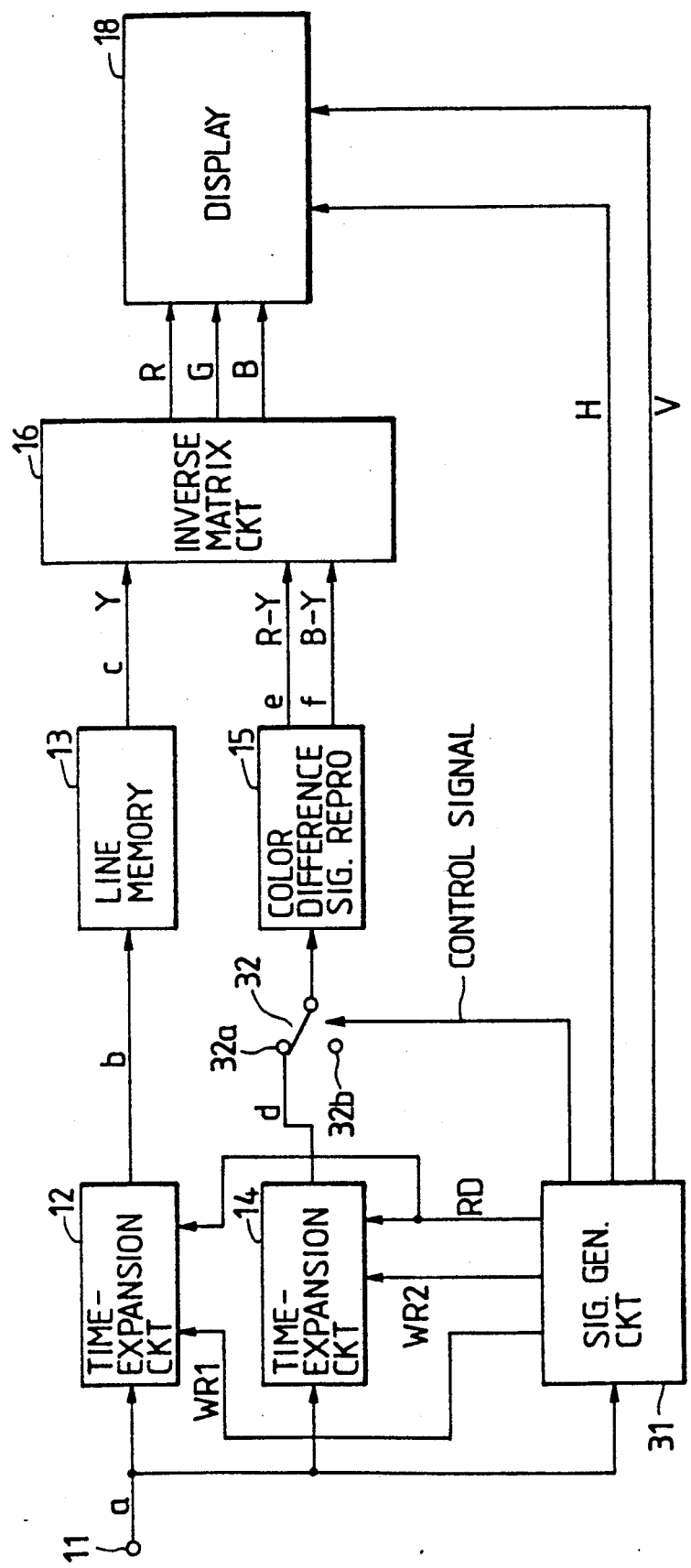
FIG. 1 is a block diagram of an embodiment of the invention.

Referring now to the drawings, FIG. 1 is a block diagram of a video processing apparatus of an embodiment according to the invention.

Figure 5:
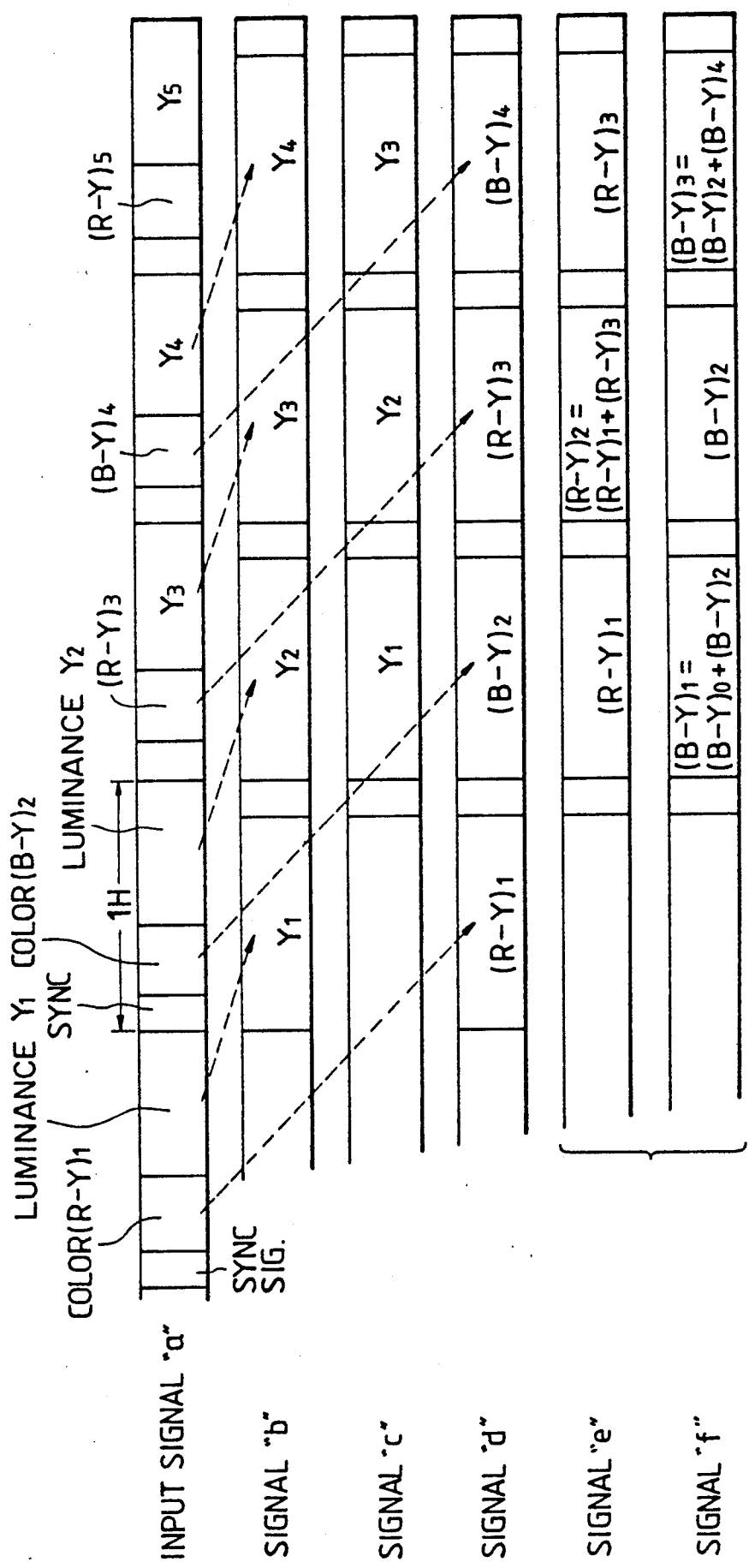
FIG. 5 is a timing chart of signals processed in the circuit of FIG. 1.

In FIG. 1, an input video signal "a" of MAC system is applied to an input terminal 11 and is sent to a time-expansion circuit 12, a time-expansion circuit 14, and a signal generation circuit 1. The time-expansion circuit 12 expands the signal "a" with respect to time base by an expansion ratio of "3/2" to reproduce a luminance signal in response to a write clock WR1 and a read clock RD from the signal generation circuit 31. Actually, the time-expansion circuit 12 is a digital memory which stores its input data in response to the write clock WR1 and outputs the stored data in response to the read clock RD. The time-expansion circuit 14 expands the signal "a" by an expansion ratio of three to reproduces a color difference signal with respect to time base in response to write clock WR2 and the read clock RD from the signal generation circuit 31. Actually, the time-expansion circuit 12 is a digital memory which stores its input data in response to the write clock WR1 and outputs the stored data in response to the read clock RD. An output signal "b" from the time-expansion circuit 12 is sent to a line memory 13 delaying the signal "b" and outputting a signal "c" for the subsequent horizontal scanning period, as shown in FIG. 5 of a timing chart. An output signal "d" from the time-expansion circuit 14 is sent to a color difference signal reproducing circuit 15 through a switch 32. The color difference signal reproducing circuit 15 reproduces simultaneously two color difference signals from MAC video signal where two color difference signals line-sequentially transmitted alternately. FIG. 5 shows a relation of timing between the signal "d" and the signals "e" and "f" reproduced from the signal "d". The line memory 13 adjusts timing relation between the luminance and color difference signals. An output signal "c" from the line memory 13 and output signals "e" and "f" are sent to an inverse matrix circuit 10 which reproduces primary color signals R. G. and B. A display 18 reproduces a picture image from the primary color signals R. G, and B in response to horizontal and vertical signals from the signal generation circuit 31. The switch 32 outputs the signal "d" in response to a control signal from the signal generation circuit 31.

Figure 2:
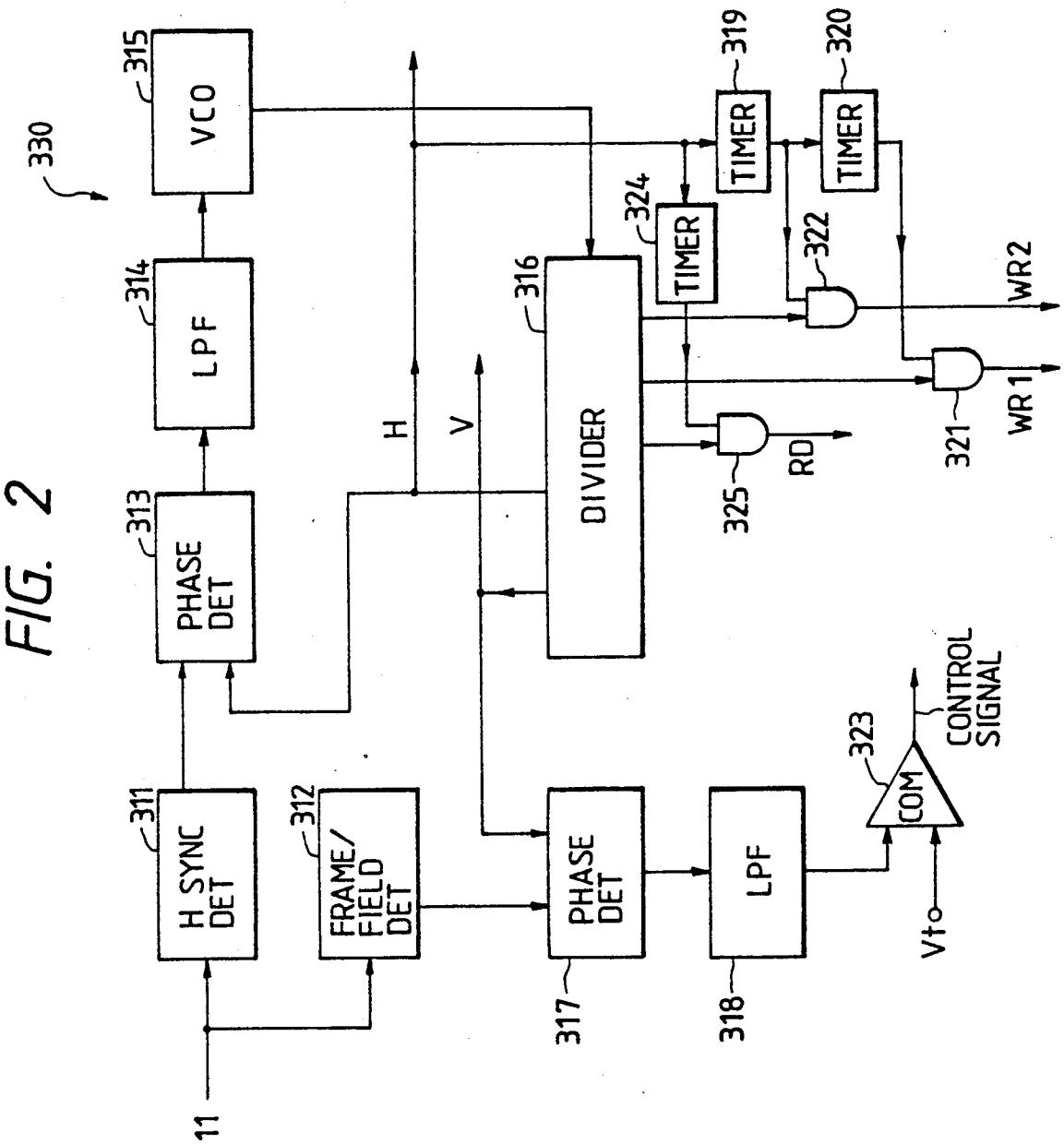
FIG. 2 is a block diagram of a signal generation circuit of FIG. 1.
Figure 3:
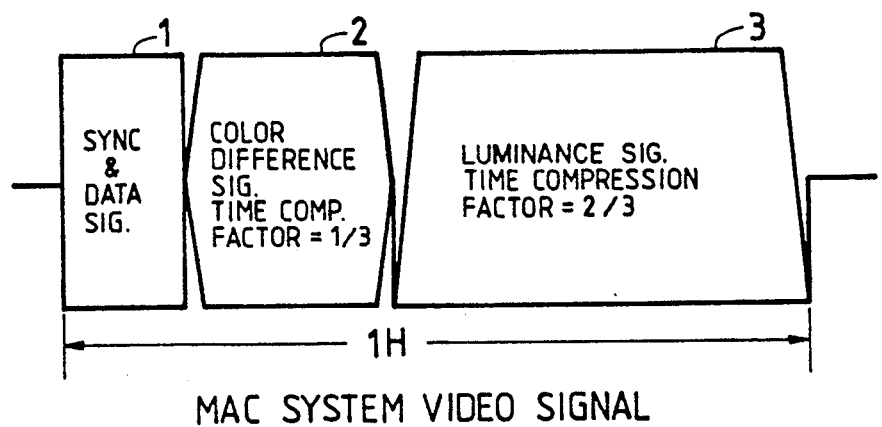
FIG. 3 and 4 are illustrations for illustrating component signals of video signals MAC and TCI systems respectively.
Figure 4:
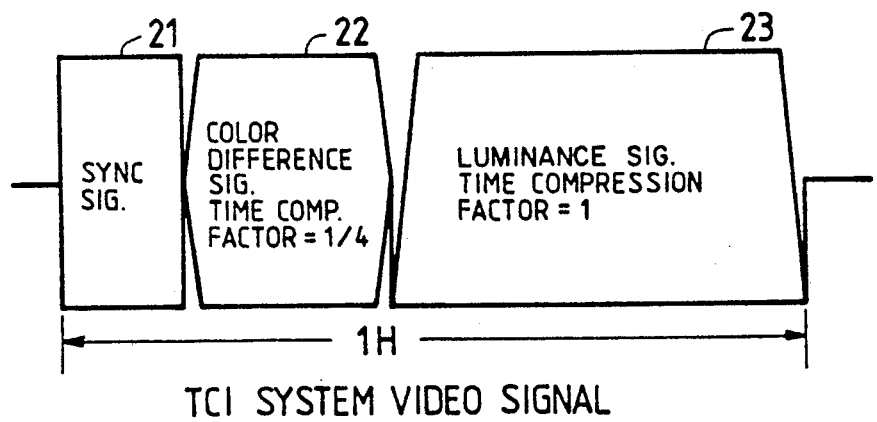

FIG. 2 is a block diagram of the signal generation circuit 31. In FIG. 2, the video signal is applied to a horizontal synchronizing pulse detection circuit 311 and a frame/field detection circuit 312. The horizontal synchronizing pulse detection circuit 311 detects a horizontal synchronizing pulse sent to a phase-locked loop circuit (PLL) 330 including a phase detector 313, a low-pass filter 314, a voltage controlled oscillator (VCO) 315, and divider 316. The phase detector 313 detects a phase difference degree between the horizontal synchronizing pulse and an output signal from the divider 316. An output signal of the phase detector 313 is sent to VCO 315 through a low-pass (LPF) filter 314. The VCO 315 oscillates at a frequency in accordance with a level of an output signal of the low-pass filter 314. The divider 316 divides frequencies of an output signal from the VCO 315 by a first ratio determined by the compression factor "2/3" of the input luminance signal to produce the write clock WR1 sent to the time-expansion circuit 12 through an AND gate 321; by a second dividing ratio determined by the compression factor "⅓" of the input color difference signal to output the write clock WR2 sent to the time-expansion circuit 14 through an AND gate 322; a third dividing ratio for generating synthesized horizontal synchronizing pulse H: and by a fourth dividing ratio to produce a synthesized vertical synchronizing pulse V. A timer 319 with a predetermined interval corresponding to a period of the color difference signal transmitted outputs a timing signal in response to the horizontal signal H from the divider 316. The timing signal is sent to the AND gate 322 which controls output timing of the write clock WR2. A timer 320 with a predetermined interval corresponding to a period of the luminance signal transmitted outputs a timing signal in response to an output signal from the timer 319. The timing signal is sent to the AND gate 321 which controls output timing of the clock WR1. The divider 316 further divides frequencies of the output from the VCO 315 for reading the stored data to be expanded, to produce a read signal. The read signal is sent to an AND gate 325 whose another input responds an output of a timer 324. The timer 324 with a predetermined interval corresponding to a horizontal scanning period responds to the horizontal synchronizing pulse H. Thus, the stored data in the time-expansion circuits 12 and 14 are read for one horizontal scanning period. The frame/field detector 312 detects a frame pulse train and horizontal pulses from the input video signal "a" and produces a field pulse from the detected frame pulse train and a given number of horizontal pulses. The frame/field detector 312 can also output frame pulse trains. The divider 316 is reset by the field pulse from the frame/field detector 312 at beginning of reception of the video signal "a" to synchronize its output signal with the video signal. A phase detector 317 detects degree of phase difference between the filed pulse and the synthesized vertical synchronizing pulse V to produce a phase error signal. An output of the phase detector 317 is sent to a low-pass filter 318 whose time constant is determined by an interval corresponding to a vertical scanning period. The low-pass filter 318 converts a pulse-like signal from the phase detector 317 into an analog signal and holds its output level for more than one vertical scanning interval by its time constant. An output of the low-pass filter 318 is sent to a comparator 323 comparing it with a predetermined reference signal Vt to output a control signal sent to the switch 32. The switch 32 transfers the signal "d" when the phase error signal is not detected by the phase detector 317 and comparator 323. The holding level of an output signal of the phase detector 317 or an output signal of comparator 323 can be also made by digital technique.

When the phase-locked loop circuit 330 is out of phase i.e. not locked, the synthesized vertical synchronizing pulse is not in phase with the field pulse. Accordingly, the phase detector 317 sends the phase error signal to the comparator 323 through the low-pass filter 318. The comparator 323 produces the control signal by comparing the phase error signal with the reference signal Vt. Thus, the control signal is sent to the switch 32. The switch 32 does not transfer the signal "d" to the color difference signal reproduction circuit 15 when the phase detector 317 detects that the synthesized vertical synchronizing pulse is out of phase with detected field pulse. Therefore, there is no double image on the display 18 because color signals are not outputted from the switch 32 but the luminance signal when PLL 30 is not locked.

The control signal can be produced by phase detection between a synthesized frame pulse and a frame pulse detected from the video signal "a". The synthesized frame pulse is produced by dividing the synthesized vertical synchronizing pulse by "2".

Figure 6:
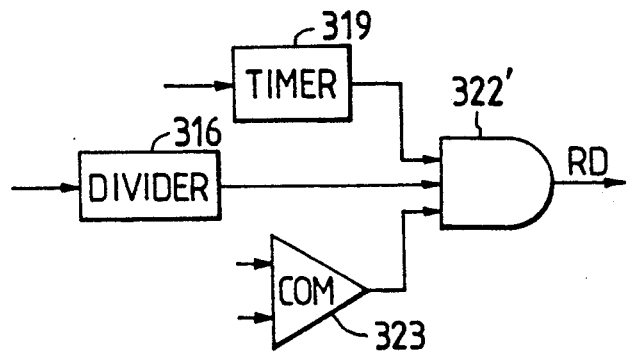
FIGS. 6, 7, and 8 show modified circuit arrangements of the embodiment of FIG. 1.
Figure 7:
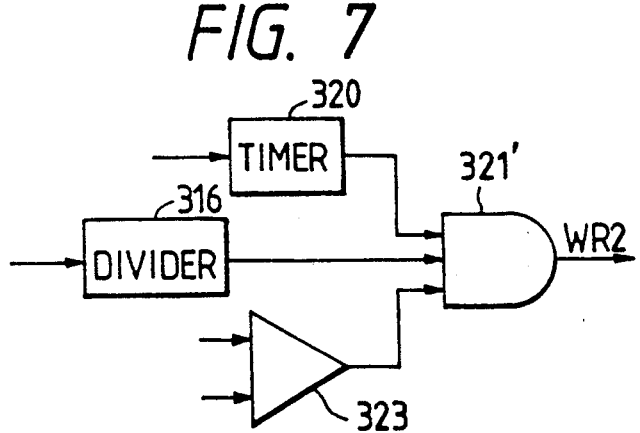

FIGS. 6 and 7 show modified circuit arrangements for selectively outputting the signal from the time-expansion circuit 14. In FIG. 6, a three-input AND gate 322' is provided in stead of the AND gate 322. The AND gate 322'responds to the output signal of the comparator 323 in addition to the output signal of the timer 319 and the output from the divider 316 for control of outputting the read pulse RD. In FIG. 7, a three-input AND gate 321' is provided in stead of the AND gate 321. The AND gate 321' responds to the output signal of the comparator 323 in addition to the output signal of the timer 320 and the output from the divider 316 for control of outputting the write clock WR2. Such control is also performed by switch 32 placed on the input side of the time-expansion circuit 14 for sending the video signal "a" to the time-expansion circuit 14.

Figure 8:
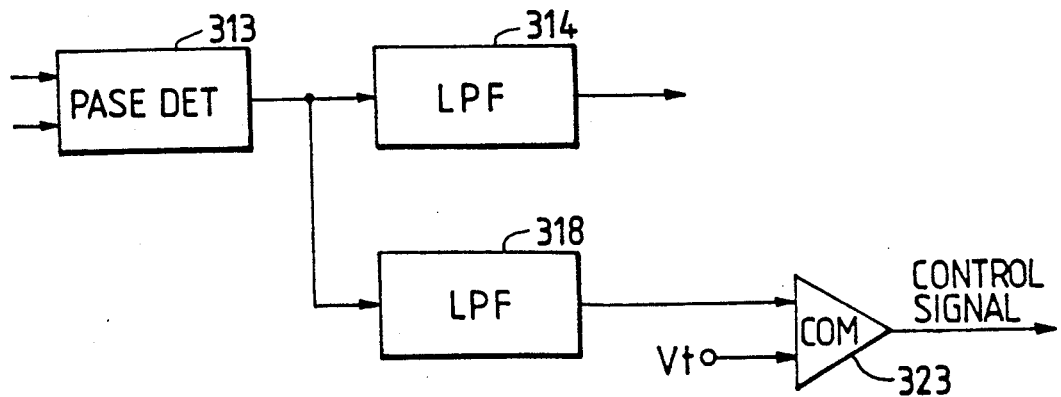

The FIG. 8 shows further a modified circuit arrangement. In FIG. 8, the low-pass filter 318 and comparator 323 responds to the output of phase detector 313 instead of the output of phase detector 317. The output signal of the comparator 323 is the control signal for controlling the switch 32.

What is claimed is:

1. A video signal processing apparatus for processing a video signal including first and second trains of synchronizing pulses, a color difference signal time-compressed with a first compression factor and luminance signal time-compressed with a second compression factor which is different from said first compression factor, said color difference signal and luminance signals being transmitted sequentially for one horizontal line for simultaneously outputting time-reproduced color difference and luminance signals, said video signal processing apparatus comprising:
    (a) first time-expansion means for producing said time-reproduced luminance signal in response to a first clock;
    (b) second time-expansion means for producing said time-reproduced color difference signal in response to a second clock;
    (c) switching means for selectively outputting said time-reproduced color difference signal in response to a control signal;
    (d) phase-locked loop means responsive to said first trains of synchronizing pulses, said phase-locked loop means including frequency dividing means having a first dividing ration determined by said first compression factor for producing said first clock, a second dividing ratio determined by said second compression factor for producing said second clock, and a third dividing ratio for producing synthesized synchronizing pulses corresponding to said second train of synchronizing pulses; and
    (e) phase detecting means for detecting when said second train of synchronizing pulses and said synthesized synchronizing pulse have given phase relation therebetween to produce said control signal.

2. A video signal processing apparatus as claimed in claim 1, wherein said first time-expansion means comprises a first memory for storing said luminance signal in response to said first clock, said second time-expansion means comprises a second memory for storing said color difference signal in response to said second clock, and said dividing means further has a fourth dividing ratio for producing a read clock, said stored luminance and color difference signals being read out for one horizontal scanning interval by said read clock from said first and second memories.

3. A video signal processing apparatus as claimed in claim 1, wherein said first train of synchronizing pulses is a train of horizontal synchronizing pulses and said second train of synchronizing pulse is a train of field pulses.

4. A video signal processing apparatus as claimed in claim 1, wherein said first train of synchronizing pulses is a train of horizontal synchronizing pulses and said second train of synchronizing pulse is a train of frame pulses.

5. A video signal processing apparatus as claimed in claim 1, wherein said switching means is provided so as to output said stored color difference signal.

6. A video signal processing apparatus as claimed in claim 1, wherein said switching means is provided so as to send said video signal to said second time-expansion means.

7. A video signal processing apparatus as claimed in claim 2, wherein said switching means is provided so as to output said read clock.

8. A video signal processing apparatus as claimed in claim 1, wherein said switching means is provided so as to output said second clock.

9. A video signal processing apparatus as claimed in claim 1, wherein said phase detecting means comprises a phase comparator for producing an output signal through comparison and a voltage comparator for comparing said output signal with a predetermined reference signal to produce said control signal.

10. A video signal processing apparatus as claimed in claim 9, further comprises a low-pass filter for passing low-frequency components from an output signal of said phase comparator.

11. A video signal processing apparatus for processing a video signal including first and second trains of synchronizing pulses, a color difference signal time-compressed with a first compression factor and luminance signal time-compressed with a second compression factor which is different from said first compression factor, said color difference signal and luminance signals being transmitted sequentially for one horizontal line for simultaneously outputting time-reproduced color difference and luminance signals, said video signal processing apparatus comprising:
    (a) first time-expansion means for producing said time-reproduced luminance signal in response to a first clock;
    (b) second time-expansion means for producing said time-reproduced color difference signal in response to a second clock;
    (c) switching means for selectively outputting said time-reproduced color difference signal in response to a control signal;
    (d) phase-locked loop means responsive to said first trains of synchronizing pulses, said phase-locked loop means including:
        (i) frequency dividing means having a first dividing ratio determined by said first compression factor for producing said first clock, a second dividing ratio determined by said second compression factor for producing said second clock, a third dividing ratio for producing a synthesized synchronizing pulse corresponding to said one of synchronizing pulses;
        (ii) phase detecting means for detecting a phase relation between said second train of synchronizing pulses and said synthesized synchronizing pulse; and (iii) voltage controlled oscillating means for producing a clock whose frequency is changed in accordance with an output signal of said phase detecting means; and (e) a comparing means responsive to said output signal of said phase detecting means for producing said control signal when said output signal has predetermined relationship with a predetermined reference signal.

12. A video signal processing apparatus as claimed in claim 11, wherein said first time-expansion means comprises a first memory for storing said luminance signal in response to said first clock, said second time-expansion means comprises a second memory for storing said color difference signal in response to said second clock, and said dividing means further has a fourth dividing ratio for producing a read clock, said stored luminance and color difference signals being read out for one horizontal scanning interval by said read clock from said first and second memories.

13. A video signal processing apparatus as claimed in claim 11, wherein said first train of synchronizing pulses is a train of horizontal synchronizing pulses and said second train of synchronizing pulse is a train of field pulses.

14. A video signal processing apparatus as claimed in claim 11, wherein said first train of synchronizing pulses is a train of horizontal synchronizing pulses and said second train of synchronizing pulse is a train of frame pulses.

15. A video signal processing apparatus as claimed in claim 11, wherein said switching means is provided so as to output said stored color difference signal.

16. A video signal processing apparatus as claimed in claim 11, wherein said switching means is provided so as to send said video signal to said second time-expansion means.

17. A video signal processing apparatus as claimed in claim 12, wherein said switching means is provided so as to output said read clock.

18. A video signal processing apparatus as claimed in claim 11, wherein said switching means is provided so as to output said second clock.

19. A video signal processing apparatus as claimed in claim 11, wherein said phase detecting means comprises a phase comparator for producing an output signal through comparison and said comparing means comprises voltage comparator for comparing said output signal with a predetermined reference signal to produce said control signal.

20. A video signal processing apparatus as claimed in claim 19, further comprises a low-pass filter for passing low frequency components from an output signal of said phase comparator.

* * * * *